(12) United States Patent
Nakajoh (10) Patent No.: US 8,493,338 B2
(45) Date of Patent: Jul. 23, 2013

(54) MOBILE TERMINAL

(75) Inventor: Fumihiko Nakajoh, Tokyo (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 789 days.

(21) Appl. No.: 12/366,720

(22) Filed: Feb. 6, 2009

(65) Prior Publication Data

US 2009/0295743 A1 Dec. 3, 2009

(30) Foreign Application Priority Data

Jun. 2, 2008 (JP) ................ P2008-145017

(51) Int. Cl.
*G06F 3/041* (2006.01)
*G06F 3/02* (2006.01)
*G09G 5/00* (2006.01)

(52) U.S. Cl.
USPC ............................ 345/173; 345/156; 345/169

(58) Field of Classification Search
USPC .......... 345/530, 564–565, 571, 156, 168–183
See application file for complete search history.

(56) References Cited

U.S. PATENT DOCUMENTS

| 2003/0103038 | A1* | 6/2003 | Wong et al. ........... 345/158 |
| 2004/0026605 | A1 | 2/2004 | Lee et al. |
| 2006/0082540 | A1* | 4/2006 | Prior ................. 345/156 |
| 2006/0116203 | A1* | 6/2006 | Nakada et al. ......... 463/30 |
| 2006/0197750 | A1* | 9/2006 | Kerr et al. ............ 345/173 |
| 2009/0167696 | A1* | 7/2009 | Griffin ................ 345/169 |
| 2009/0199130 | A1* | 8/2009 | Tsern et al. ........... 715/810 |
| 2010/0127994 | A1 | 5/2010 | Aono et al. |

FOREIGN PATENT DOCUMENTS

| JP | 2004-078957 A | 3/2004 |
| JP | 2007-274136 A | 10/2007 |
| JP | 2008-084144 A | 4/2008 |

OTHER PUBLICATIONS

Japanese Office Action dated Jan. 10, 2012 as received in application No. 2008-145017.

\* cited by examiner

*Primary Examiner* — Lun-Yi Lao
*Assistant Examiner* — Jarurat Suteerawongsa
(74) *Attorney, Agent, or Firm* — Maschoff Brennan (57) ABSTRACT

A mobile terminal is provided with a touch screen for displaying and inputting data, a detection unit for detecting the input path of the diagonal line upon input through the touch screen, a set unit for setting the user's operating hand based on the input path, and the display control unit for displaying the display mode determined based on the operating hand.

5 Claims, 5 Drawing Sheets

MOBILE TERMINAL

BACKGROUND OF THE INVENTION

1. Field of the Invention

The present invention relates to a mobile terminal provided with a touch screen for displaying and inputting data, which identifies a user's operating hand for holding the terminal based on an input through the touch screen, and determines the display mode based on the identified operating hand.

2. Description of the Related Art

Unlike the desktop personal computer, the main body of the mobile terminal has been required to be compact for improving portability. The key input system is required to satisfy contradicting requirements to be compact and to establish the operability to a certain level. Various arts have been developed for improving the operability of the mobile terminal upon input through the key.

Normally, every user is expected to operate the mobile terminal in accordance with the key arranged thereon. Therefore, the user has to adaptively use the mobile terminal device. Specifically, such factors as the size of the user's hand, the accessible range of the finger of the user's hand for holding the terminal device, and the difference in the finger accessible range between the right hand and the left hand for holding the terminal have not been considered.

When the user operates the mobile terminal having the touch screen as the input/output interface with one hand, there may be a region where the user feels it difficult to access the touch screen with the finger, or there may be a case where the touch screen display is hidden by the user's operating hand.

Japanese Unexamined Patent Application Publication No. 2007-274136 discloses the mobile terminal device capable of laying out the operation keys displayed on the touch panel in accordance with the user for improving the usability. The mobile terminal device is structured to display the operation keys on the display unit for inputting through the touch panel. The display position and range of the operation keys on the display may be determined based on the user's operation for drawing a circle or a polygon on the touch panel. Based on the determined display position and range, the operation keys are displayed on the display unit.

However when the display position and range are defined by the circular line drawn by the user on the touch screen, the starting point of the circular line and the rotating direction of the path largely depend on the user's habit. It is therefore difficult to identify the user's operating hand for holding the terminal device, that is, whether the left hand or the right hand. As the center (gravity center) of the circular line depends on the size of the touch screen, it is difficult to identify the user's operating hand for holding the terminal device based on the circular line drawn by the user.

Normally, in takes time for the user to draw the circular line on the touch screen because of the complicated operation of the finger joint. When the circular line is input quickly, the circle is likely to become so small that the operation keys displayed in the circle are too small for operation.

As drawing of the circular line on the touch panel is lengthy, the time required for the input operation and the determination become prolonged.

SUMMARY OF THE INVENTION

Accordingly, it is an object of the present invention to provide a mobile terminal provided with a touch screen for displaying and inputting data, which is structured to identify the user's operating hand for holding the terminal cased on the input through the touch screen and to provide the user interface in accordance with the identified operating hand for improving the operability for the user without providing the additional sensor.

The present invention provides a mobile terminal which includes a touch screen for displaying and inputting data, a detection unit to detect an input path of a diagonal line input through the touch screen, a setting unit to set a mode in accordance with a user's operating hand identified based on the input path detected by the detection unit, and a display control unit to determine a display method of a user interface based on the mode set by the set unit so as to be displayed.

The mobile terminal according to the present invention is provided with a touch screen for displaying and inputting data, and structured to identify the user's operating hand for holding the terminal based on the input through the touch screen and to provide the user interface in accordance with the identified hand for improving the operability for the user without providing the additional sensor. More specifically, the user's operating hand may be identified based on the simple operation to draw the diagonal line on the touch screen. The identification may be made without being influenced by the user's habit. The user is capable of inputting the line in the direction which allows the finger joint of the operating hand to be easily moved. This makes it possible to reduce the time for inputting operation and to easily perform the identification.

DETAILED DESCRIPTION

Figure 1:
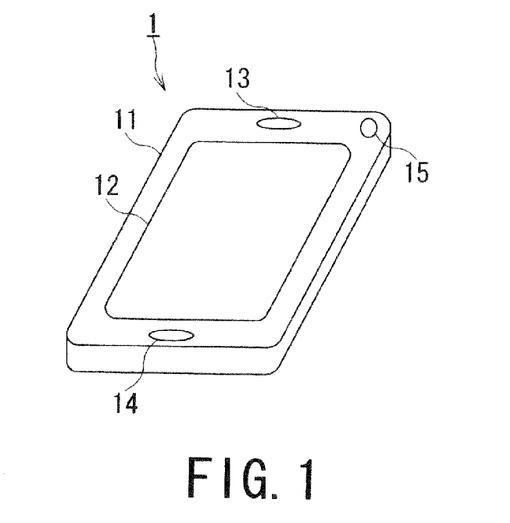
FIG. 1 is a perspective view of a mobile terminal (mobile phone) according to the present invention.

A mobile terminal according to the present invention may be a card shape mobile phone. FIG. 1 is a perspective view of the mobile phone.

The mobile phone 1 includes a casing 11 with one surface provided with a touch screen 12, a speaker 13 for outputting sounds, a microphone 14 for inputting the sounds, and a power button 15 for switching the ON/OFF state of the power of the mobile phone 1.

The touch screen 12 displays an image corresponding to the state of the mobile phone, and detects user's operation when the user touches the screen with the finger or the pen. The touch screen 12 is formed by arranging a plurality of contact detection elements on the display and laminating the transparent screen on the elements. The touch screen 12 detects the contact on the touch screen 12 by sensing a pressure change, a static signal, or the like.

Figure 2:
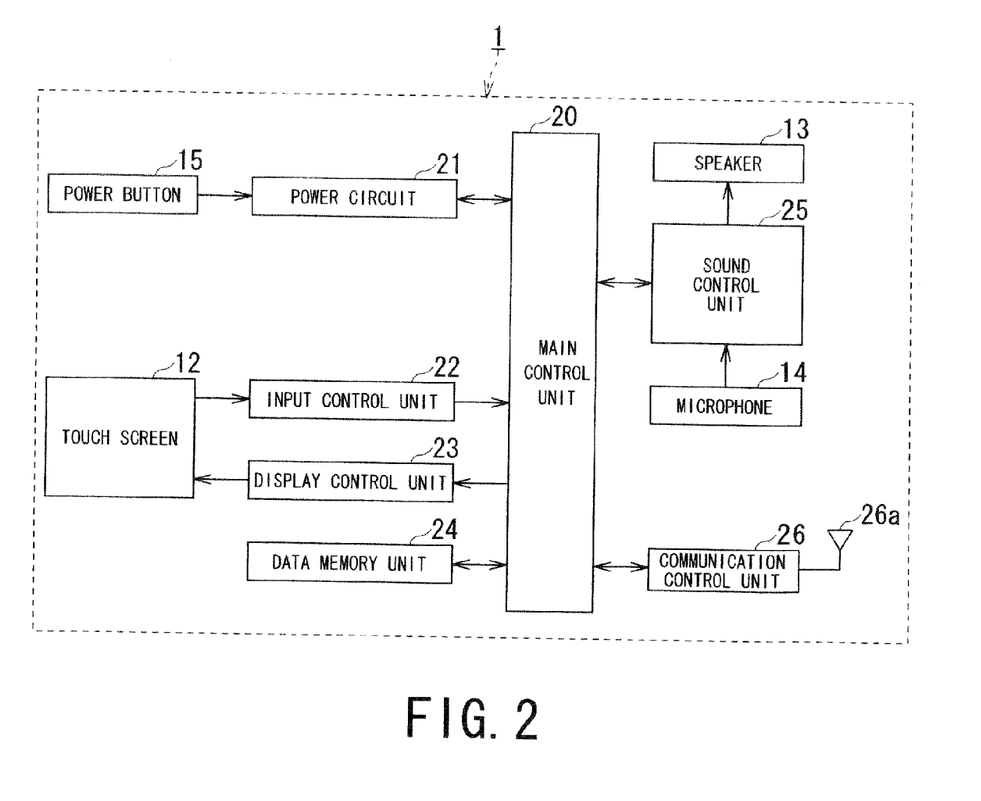
FIG. 2 is a function block diagram of the mobile terminal (mobile phone) according to the present invention.

FIG. 2 is a functional block diagram of the mobile phone 1. The mobile phone 1 is formed by a main control unit 20, a power circuit 21, an operation input control, unit 22, a display control unit 23, a data memory unit 24, a sound control unit 25, and a communication control unit 26, and these units are electrically connected mutually via bus.

The main control unit 20 includes a CPU for centrally controlling the mobile phone 1 as well as performing the display control process and other calculation and control operations to be described later. The power circuit 21 switches the ON/OFF state of the power when the user operates the power button 15. When the power is in ON state, power is supplied to the respective components from the built-in power supply (battery) or the externally connected power supply so as to activate the mobile phone 1.

The input control unit 22 detects the pressure exerted to the touch screen 12, generating a signal indicating the detected position, and transmitting the signal to the main control unit 20. The display control unit 23 displays characters and images on the touch screen 12 under the control of the main control unit 20.

The data memory unit 24 includes a ROM for storing programs to be executed by the main control unit 20 and data required to the process, a hard disk, a non-volatile memory, and a RAM for temporarily storing data used for the process executed by the main control unit 20. The program and data used for the display control executed by the main control unit 20 are stored in the data memory unit 24.

The sound control unit 25 converts an analog sound signal input, through the microphone 14 into a digital sound signal under the control of the main control unit 20. In addition, the sound control unit 25 converts the obtained digital sound signal into the analog sound signal under the control of the main control unit 20 for outputting the sound from the speaker 13.

The communication control unit 26 receives a signal from the base station via the antenna 26a, and executes spread spectrum inverse processing to acquire data under the control of the main control unit 20. The data may be transmitted to the sound control unit 25 to be output from the speaker 13, transmitted to the display control unit 23 to be displayed on the touch screen 12, or stored in the data memory unit 24 based on the command of the main control unit 20.

In addition, the communication control unit 26 executes spread spectrum processing under the control of the main control unit 20 to generate spread spectrum signal from the data such as the sound signal input through the microphone 14, the data input through the touch screen 12, and the data stored in the data memory unit 24. Then, the communication control unit 26 transmits the spread spectrum signal to the base station via the antenna 26a.

Figure 3A:
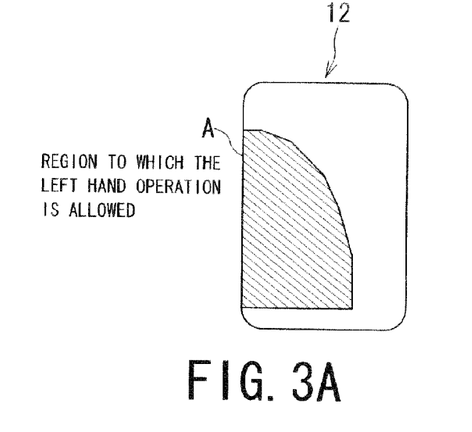
FIG. 3A is a diagrammatic illustration of an accessible range on the screen when the left hand is used as an operating hand.
Figure 3B:
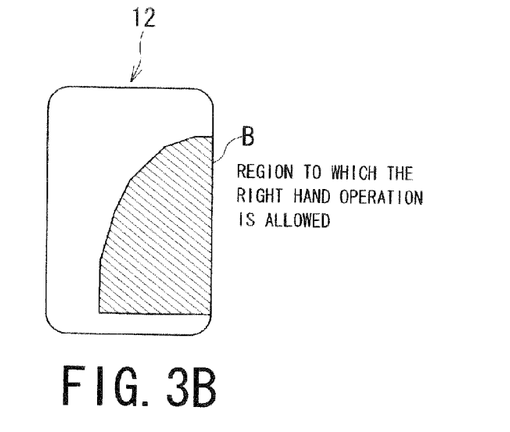
FIG. 3B is a diagrammatic illustration of the accessible range on the screen when the right hand is used as the operating hand.

Generally, when the user holds the mobile phone 1 with either left or right hand and touches the touch screen 12 using the thumb of the operating hand holding the mobile phone 1. The region of the touch screen 12 accessible by the user's hand is limited. The data memory unit 24 preliminarily stores the range of the touch screen 12 accessible by the user's left hand for holding the mobile phone, and the range of the touch screen 12 accessible by the user's right hand for holding the mobile phone 1. FIGS. 3A and 3B are front views of the touch screen 12. When the user holds the mobile phone 1 with the left hand, a region A on the touch screen 12 is accessible by the left hand as shown in FIG. 3A. When the user holds the mobile phone 1 with the right hand, a region B on the touch screen 12 is accessible by the right hand as shown in FIG. 3B.

Figure 4A:
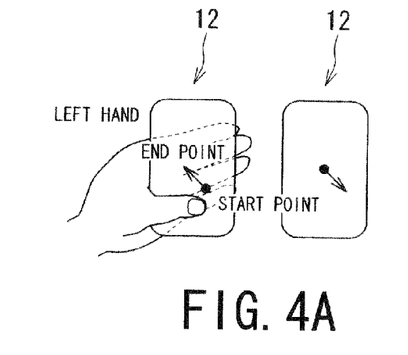
FIG. 4A is a diagrammatic illustration of a movement path of the user's left hand thumb.
Figure 4B:
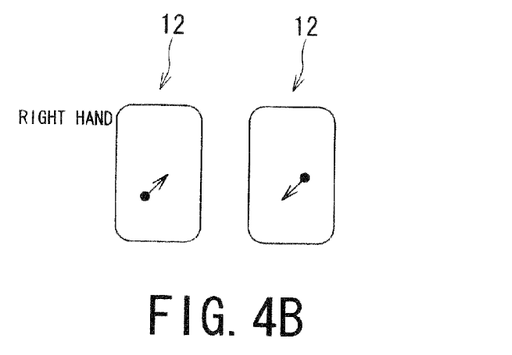
FIG. 4B is a diagrammatic illustration of the movement path of the user's right hand thumb.

Specifically, when the user holds the mobile phone 1 with the left, hand, it is generally operated by the thumb of the left hand which naturally moves around the base of the thumb in the direction from lower right to the upper left or vice versa as shown in the front view of FIG. 4A. When the user holds the mobile phone 1 with the right hand, it is generally operated by the thumb of the right hand which naturally moves around the base of the thumb in the direction from lower left to the upper right or vice versa as shown in the front view of FIG. 4B.

In the case where the user touches the touch screen 12 with the thumb of the operating hand, the movement path from the start point (the position on the touch screen 12 touched by the finger) to the end point (position on the touch screen 12 where the finger moves away after the movement in contact, wish the screen) becomes a diagonal (arc) line because of the natural movement of the thumb joint. It is preferable to provide the user interface for the input operation within the diagonal line area.

Figure 5A:
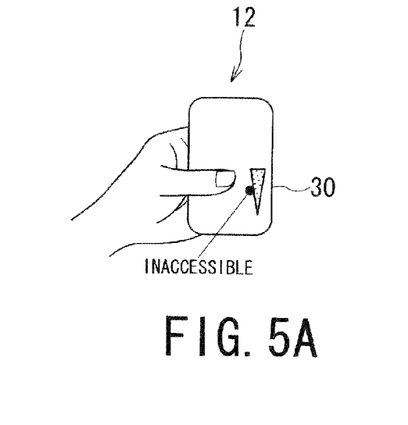
FIG. 5A is a diagrammatic illustration of the scroll bar displayed at the position which does not allow the user's left hand to reach.

Referring to FIG. 4A, when the user holds the mobile phone 1 with the left hand, the thumb is capable of accessing only the region A shown in FIG. 3A. In the case where a zooming slider 30 or a scroll bar using the left hand is displayed on the region other than the region A on the touch screen as shown in FIG. 5A, it is impossible for the user to operate the zooming slider 30 or the scroll bar while holding the mobile phone 1 with the left hand.

Figure 5B:
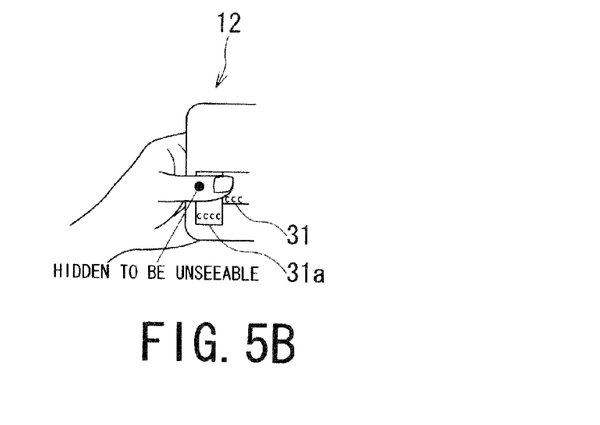
FIG. 5B is a diagrammatic illustration of the state where the menu is hidden by the finger of the user's left hand for operating the pop-up menu.

In addition, in the case where the user holds the mobile phone 1 with the left hand as shown in FIG. 4A, and a pop-up menu 31 and a sub-menu 31a are displayed on the touch screen 12 as shown In FIG. 53, the pop-up menu 31 may be hidden by the base of the left hand when the user tries to operate the sub-menu 31a with the fingertip of the left hand.

Figure 6:
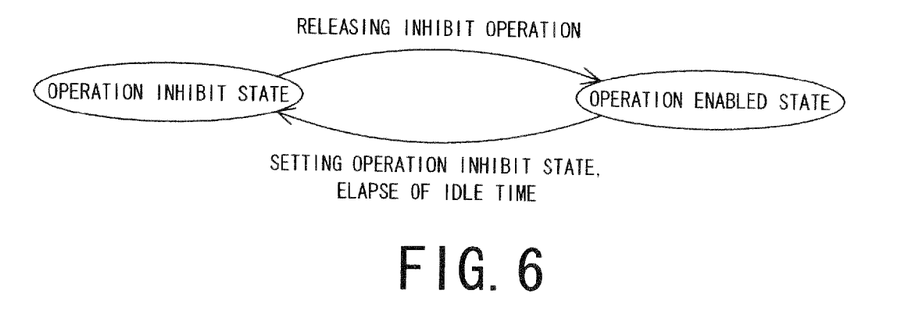
FIG. 6 is a diagrammatic illustration of the conditions with respect to the use of the mobile terminal (mobile phone) according to the present invention in the transition from the operation inhibit state to the operation enabled state or vice versa.

Referring to FIG. 6, the mobile phone 1 in an operation enabled state which accepts the operation through the touch screen 12 executes the transition to an operation inhibit state which inhibits the display on the touch screen 12 and the input through the touch screen 12 when the non-operation state continues for a predetermined time or a predetermined user operation is input. When the user tries to operate the mobile phone 1 in the operation inhibit state, the operation cannot be performed until the operation inhibit state is released. The user may bring the mobile phone 1 into the operation inhibit state so as to be carried in the pocket or bag for the purpose of preventing the accidental operation.

The operation inhibit state of the mobile phone 1 is released upon the user operation for releasing the operation inhibit state through the touch screen 12 so as to be returned into the normal operation enabled state.

The operation inhibit state of the mobile phone 1 may be released by drawing the diagonal line on the touch screen 12 with the thumb of the hand for operating the mobile phone 1. The diagonal line may be drawn in the direction from upper right to the lower left for vice versa) or from upper left to the lower right (or vice versa).

When the user holds the mobile phone 1 with the left hand to draw the diagonal line on the touch screen 12, the thumb naturally moves around its base (in the direction from upper left to lower right or vice versa). Meanwhile, when the user holds the mobile phone 1 with the right hand to draw the diagonal line on the touch screen 12, the thumb naturally moves around its base (in the direction from upper right to the lower left or vice versa). The user's operating hand may be identified based on the operation by the user for releasing the operation inhibit state.

When the user touches the touch screen 12 while moving the finger in the direction from the lower right to the upper left, or vice versa as shown in FIG. 4A for releasing the operation inhibit state, it may be determined that the user holds the mobile phone 1 with the left hand. Likewise, when the user touches the touch screen 12 while moving the finger in the direction from the lower left to the upper right or vice versa, it may be determined that the user holds the mobile phone 1 with the right hand.

Figure 7:
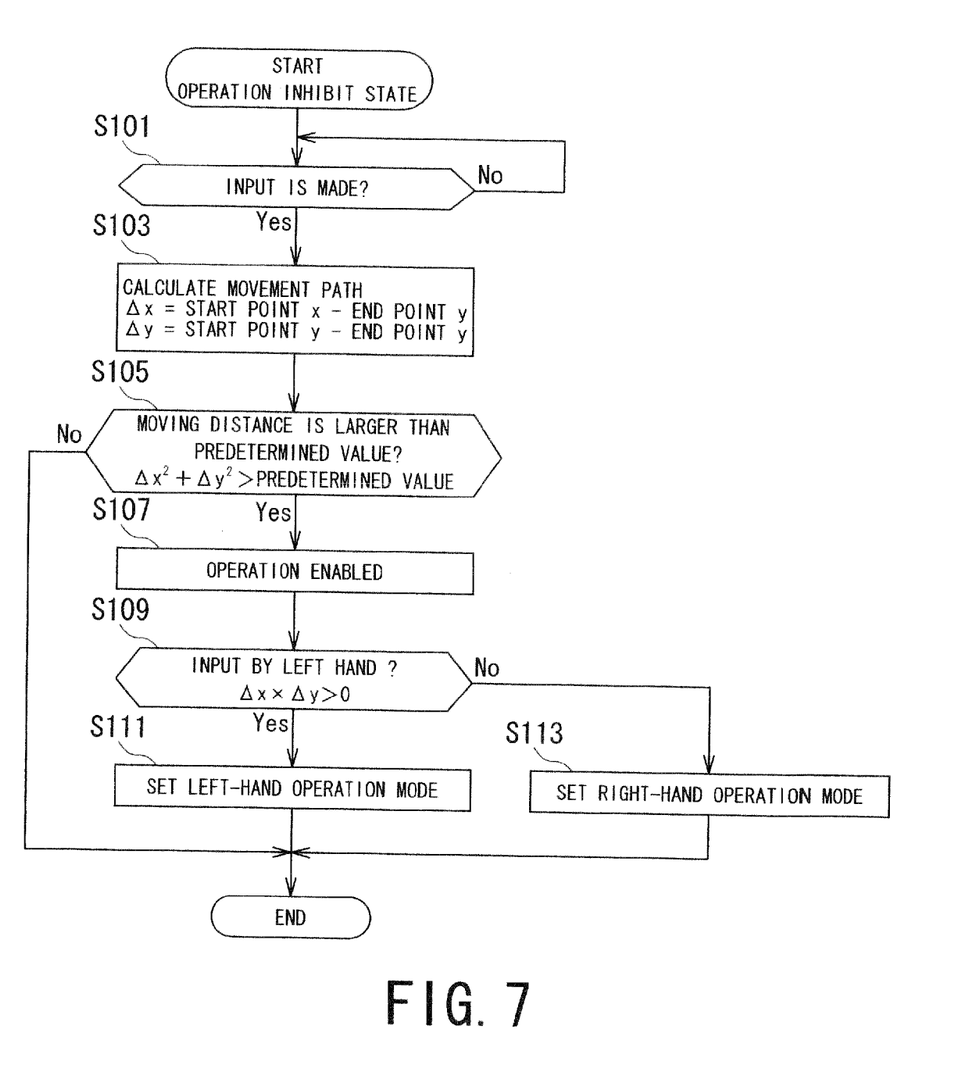
FIG. 7 is a flowchart of a display control process performed by the mobile terminal (mobile phone) according to the present invention.

The display control process for performing the display on the touch screen 12 based on the user's operating hand identified when the mobile phone 1 returns its state from the operation inhibit state will be described referring to the flowchart shown in FIG. 7. It is assumed that the mobile phone 1 is in the operation inhibit state in the initial state.

Figure 8:
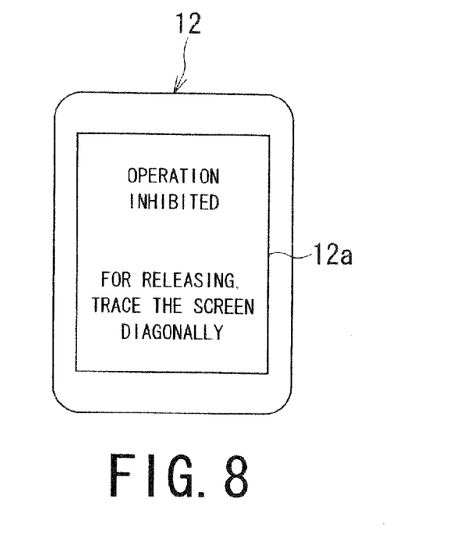
FIG. 8 is a diagrammatic illustration of the screen displayed in response to the input to the touch screen when the mobile terminal (mobile phone) is in the operation inhibit state.

The user touches the touch screen 12 of the mobile phone 1 which is in the operation inhibit state so as to be brought the mobile phone 1 into the operation enabled state. Upon detection of the input via the touch screen 12 in the operation inhibition mode, the mobile phone 1 is structured to allow a display region 12a with such message as "For releasing, trace the screen diagonally." to be displayed on the touch screen 12 as shown in FIG. 8. Upon releasing the operation inhibit state of the mobile phone 1, the user touches the touch screen 12 diagonally in accordance with the message.

The main control unit 20 determines whether or not the input is made through the touch screen 12 (S101). When no input is made (No in S101), the main control unit 20 keeps the mobile phone 1 in the operation inhibit state until the input through the touch screen 12 is made.

Figure 9A:
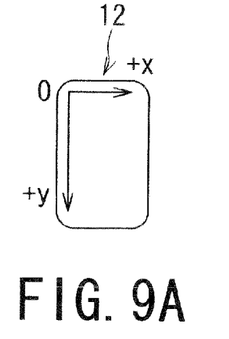
FIG. 9A shows a coordinate system, on the touch screen.

When the input is made through the touch screen 12 (Yes in S101), the main control unit 20 obtains an input movement path on the touch screen 12 (S103). The determination with respect to the gradient of the diagonal line on the touch screen 12 may be made based on the positional relationship between the position where the user's finger touches the touch screen 12 (start point) and the position where the user's finger moves away from the touch screen 12 (end point). Referring to FIG. 9A, the coordinate system may be used, which has the top position at the upper left on the touch screen 12 as the zero point, and +x rightward along the horizontal axis and +y downward along the vertical axis, respectively.

Figure 9B:
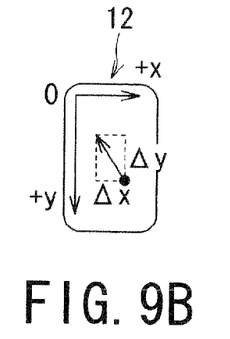
FIG. 9B shows the movement path of the operation on the touch screen performed by the user with the left hand.

When the user touches the touch screen 12 while moving the finger in the direction from the lower right to the upper left as shown in FIG. 9B, the displacement $\Delta x$ in the x direction ($\Delta x$=end point in the x direction−start point in the x direction) becomes negative, and the displacement $\Delta y$ in the y direction ($\Delta y$−end point in the y direction start point in the y direction) also becomes negative. When the user touches the touch screen 12 while moving the finger in the direction from upper left to the lower right, the displacement $\Delta x$ in the x direction becomes positive, and the displacement $\Delta y$ in the y direction also becomes positive.

Figure 9C:
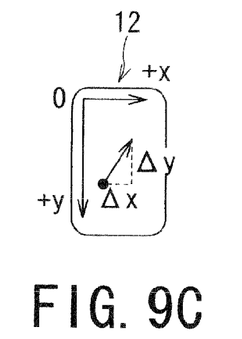
FIG. 9C shows the movement path of the operation on the touch screen performed by the user with the right hand.

Meanwhile, when the user touches the touch screen 12 while moving the finger in the direction from lower left to the upper right as shown in FIG. 9C, the displacement $\Delta x$ in the x direction becomes positive and the displacement $\Delta y$ in the y direction becomes negative. When the user touches the touch screen 12 while moving the finger in the direction from the upper right to the lower left, the displacement $\Delta x$ in the x direction becomes negative, and the displacement $\Delta y$ in the y direction becomes positive.

The main control unit 20 determines whether or not the moving distance on the touch screen 12 is equal to or larger than a predetermined value (S105). The moving distance is calculated based on the displacement $\Delta x$ in the x direction and the displacement $\Delta y$ in the y direction which are obtained in S103. When the value ($\Delta x2 + \Delta y2$) is larger than a predetermined value, it is determined that the moving distance is equal to or larger than the predetermined value. The determination is made for allowing the operation of the mobile phone 1 only when the user touches the touch screen 12 for changing the state of the mobile phone 1 from the operation inhibit state to the operation enabled state. Accordingly, in the case where the touch screen 12 is accidentally touched for some reason against the user's intention, the mobile phone 1 may be kept inoperative.

When the moving distance on the touch screen 12 is not equal to or larger than the predetermined value (No in S105), the operation of the mobile phone 1 is not allowed and the display control process is finished while keeping the operation inhibit mode. When the moving distance on the touch screen 12 is equal to or larger than the predetermined value (Yes in S105), the main control unit 20 changes the operation state of the mobile phone 1 from the operation inhibit state to the operation enabled state (S107). The user is allowed to operate the mobile phone 1.

The main control unit 20 determines whether or not the input in step S101 has been made by the left hand (S109). The operating hand of the user may be identified based on the displacement $\Delta x$ in the x direction and the displacement $\Delta y$ in the y direction obtained in step S103. For example, when both the displacements $\Delta x$ and $\Delta y$ are either positive or negative as shown in FIG. 9B, the product of $\Delta x$ and $\Delta y$ becomes positive. Accordingly, it is determined that the input has been made by the left hand. Meanwhile, when one of the $\Delta x$ and $\Delta y$ is positive and the other is negative as shown in FIG. 9C, the product of $\Delta x$ and $\Delta y$ becomes negative.

Figure 10:
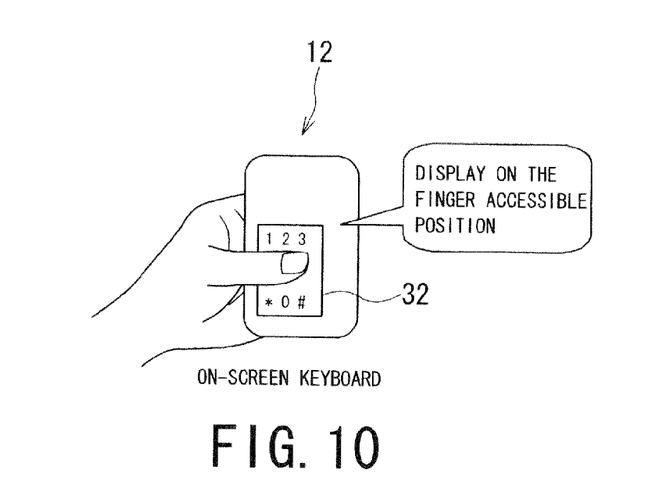
FIG. 10 is a diagrammatic illustration of the stare where an on-screen keyboard displayed on the touch screen is operated by the user with the left hand.

When the input has been made by the left hand (Yes in S109), the main control unit 20 brings the touch screen 12 into a left-hand operation mode for providing the display interface and the input interface to allow the user who holds the phone with the left hand to operate conveniently. In the left-hand operation mode, an on-screen keyboard 32 is displayed for showing the keyboard as the input device on the touch screen 12 in the region (region A shown in FIG. 3A) to which the user's left finger is accessible as shown in FIG. 10.

When the input has not been made by the left hand, that is, the input has been made by the right hand, (Yes in S109), the main control unit 20 brings the touch screen 12 into the right-hand operation mode for providing the display interface and the input interface to allow the user who holds the phone with the right hand to operate conveniently. Likewise the left-hand operation mode, in the right-hand operation mode, the on-screen keyboard 32 is displayed for showing the keyboard as the input unit on the touch screen 12 in the region (region B shown in FIG. 3B) to which the user's right finger is accessible.

Figure 11:
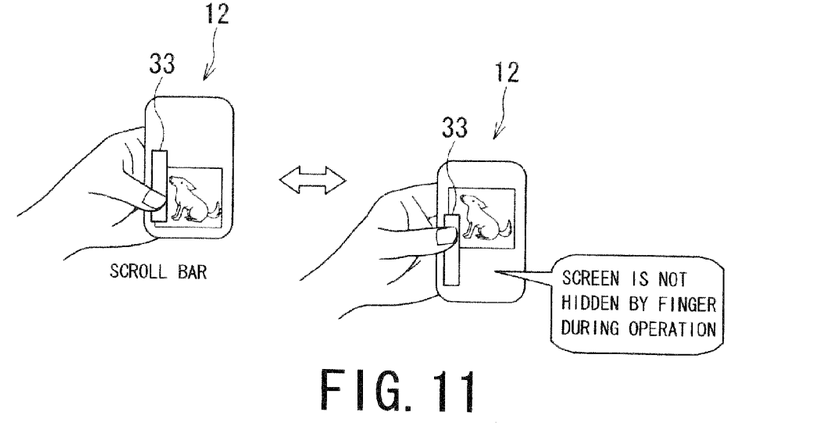
FIG. 11 is a diagrammatic illustration of the state where the user operates the scroll bar displayed on the touch screen with the left hand.

In the left-hand operation mode, the main control unit 20 displays the scroll bar 33 on the left side of the touch screen 12 in the front view as shown in FIG. 11A. In the right-hand operation mode, the main control unit 20 displays the scroll bar 33 on the right side of the touch screen 12 in the front view as shown in FIG. 11B. This allows the user to operate the scroll bar 33 with the hand for holding the mobile phone 1.

Figure 12:
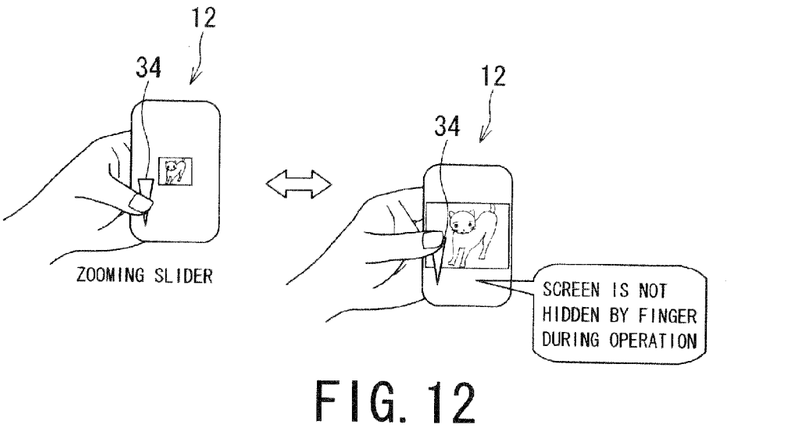
FIG. 12 is a diagrammatic illustration of the state where the user operates the zooming slider displayed on the touch screen with the left hand.

In the left-hand operation mode, the main control unit 20 displays the zooming slider 34 on the left side of the touch screen 12 in the front view as shown in FIG. 12. In the right-hand operation mode, the main control unit 20 displays the zooming slider 34 on the right side of the touch screen 12 in the front view. The user is allowed to operate the zooming slider 34 by the operating hand for holding the mobile phone 1 without being hidden by the operating hand.

Figure 13:
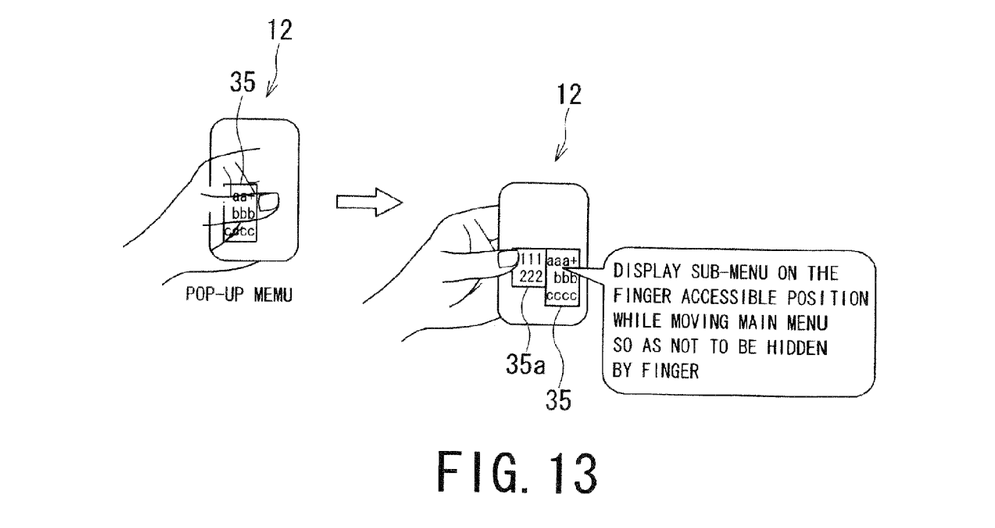
FIG. 13 is a diagrammatic illustration of the state where the user operates the menu or the pop-up menu displayed on the touch en with the left hand.

In the left-hand operation mode, the main control unit 20 displays a menu 35 on the left side of the touch screen 12 first, and then further displays a pop-up menu 35a as the sub-menu to the left of the menu 35, which is shifted so as not to be hidden by the left hand. Likewise the left-hand operation mode, the menu 35 is displayed on the right side of the touch screen 12 in the front view, and the pop-up menu 35a may further be displayed to the right of the menu 35, which is shifted so as not to be hidden by the right hand. Even when operating the pop-up menu 35a by the hand for holding the mobile telephone 1, the menu 35 is not hidden by the base of the operating hand.

The mobile phone 1 :1s structured to identify the user's operating hand based on the movement path of the finger of the operating hand which is naturally moved on the touch screen 12. This makes it possible to provide the user interface in accordance with the operating hand in the most convenience manner. The user's operating hand is detected by the operation for release the operation inhibit state without user's consciousness. The detection of the user's operating hand may be made simultaneously with the input made through the touch screen 12 for the purpose of releasing the operation inhibit state of the mobile phone 1, thus omitting the process required for operating performed only for the detection of the user's operating hand. The release of the operation inhibit state of the mobile phone 1 is likely to be performed immediately after holding the mobile phone 1. Accordingly, it is suitable for the timing at which the detection of the operating hand.

In the case either the left-hand operation mode or the right-hand operation mode is set, when the region to which the finger is not accessible on the touch screen 12 is touched, the operation mode may be switched between the left-hand operation mode and the right-hand operation mode accompanied with switching of the user's operating hand. Specifically, in the case where the touch screen 12 is in the left-hand operation mode, when the region other than the region A is touched as shown in FIG. 3A, it is determined that the operating hand for holding the mobile phone 1 is changed to the right hand. In the case where the operation mode is switched to the right-hand operation mode, or the touch screen 12 is in the right-hand operation mode, when the region other than the region B shown in FIG. 3B is touched, it is determined that the right hand for holding the mobile phone 1 has been changed to the left hand, thus allowing the left-hand operation mode to be switched.

In the case where the input on the region other than the region B shown in FIG. 3B is made when identifying with respect to the operating hand in step S109, it may be identified that the input is made by the left hand. Meanwhile, when the input has been detected in the region other than the region A, it may be identified that the input is made by the right hand.

The mobile terminal (mobile phone 1) according to the present invention is provided with the touch screen 12 for displaying and inputting data. Based on the input, through the touch screen 12, the identification with respect to the user's operating hand is made to provide the user interface adapted to the operating hand, thus improving the operability for the user without providing the additional sensor. Specifically, the operating hand is identified, based on the simple operation of the user to draw the diagonal line on the touch screen 12. The identification result is unlikely to depend on the user's way of drawing. The user is allowed to input quickly in the direction where the joint of the finger for operation is allowed to easily move. This makes it possible to reduce the time for performing the inputting operation, and to simplify the determination.

In addition, the mobile phone 1 described in the embodiment, any mobile terminal may be employed, for example, a PHS, a PDA, a mobile music player, a mobile game player so long as it is provided with the touch screen.

What is claimed is:

1. A mobile terminal comprising:
    a touch screen for displaying and inputting data;
    a detection unit to detect an input path of a diagonal line input through the touch screen;
    an identification unit to identify a user's operating hand based on the input path detected by the detection unit;
    a setting unit to set a mode in accordance with the user's operating hand identified by the identification unit; and
    a display control unit to determine a display method of a user interface for inputting based on the mode set by the set unit so as to be displayed,
    wherein the display control unit determines a display position of the user interface on the touch screen based on the mode set by the setting unit.

2. The mobile terminal according to claim 1, further comprising an inhibit operation release unit to bring the mobile terminal into an operation enabled state based on an operation for drawing a diagonal line input through the touch screen when the mobile terminal is in an operation inhibit state, wherein the detection unit detects the input path of the diagonal line input by the inhibit operation release unit for shifting into the operation enabled state.

3. The mobile terminal according to claim 2, wherein the inhibit operation release unit shifts the mobile terminal into the operation enabled state when a length of the diagonal line input through the touch screen is larger than a predetermined value.

4. The mobile terminal according to claim 1, further comprising a data memory unit for storing an operable range on the touch screen for each case where a right hand is used as the operating hand and a left hand is used as the operating hand, wherein the set unit sets the mode in accordance with the input path detected by the detection unit, and the operable range stored in the data memory unit.

5. The mobile terminal according to claim 1, wherein a display mode is determined based on a start point and an end point on the input path detected by the detection unit.

* * * * *